US006707959B2

United States Patent
Ducellier et al.

(10) Patent No.: US 6,707,959 B2
(45) Date of Patent: Mar. 16, 2004

(54) WAVELENGTH SWITCH

(75) Inventors: Thomas Ducellier, Ottawa (CA);
Filippus Stefanus Roux, Ottawa (CA);
Jacques Bismuth, Ottawa (CA)

(73) Assignee: JDS Uniphase Inc., Ottawa (CA)

( * ) Notice: Subject to any disclaimer, the term of this patent is extended or adjusted under 35 U.S.C. 154(b) by 89 days.

(21) Appl. No.: 10/051,176

(22) Filed: Jan. 22, 2002

(65) Prior Publication Data

US 2003/0012486 A1 Jan. 16, 2003

Related U.S. Application Data

(60) Provisional application No. 60/304,407, filed on Jul. 12, 2001.

(51) Int. Cl.[7] .............. G02B 6/34; G02B 6/35
(52) U.S. Cl. .............. 385/17; 385/16; 385/18; 385/24; 385/37
(58) Field of Search .............. 385/15–18, 11, 385/24, 37

(56) References Cited

U.S. PATENT DOCUMENTS

| 5,107,357 | A | | 4/1992 | Cassarly et al. .............. 359/94 |
| 6,097,519 | A | * | 8/2000 | Ford et al. .............. 398/1 |
| 6,097,859 | A | | 8/2000 | Solgaard et al. .............. 385/17 |
| 6,204,946 | B1 | * | 3/2001 | Aksyuk et al. .............. 398/9 |
| 6,263,123 | B1 | * | 7/2001 | Bishop et al. .............. 385/15 |
| 6,263,127 | B1 | * | 7/2001 | Dragone et al. .............. 385/24 |
| 6,337,935 | B1 | * | 1/2002 | Ford et al. .............. 385/24 |
| 6,415,080 | B1 | * | 7/2002 | Sappey et al. .............. 385/37 |
| 6,501,877 | B1 | * | 12/2002 | Weverka et al. .............. 385/31 |
| 6,522,404 | B2 | * | 2/2003 | Mikes et al. .............. 356/328 |
| 6,532,318 | B1 | * | 3/2003 | Brophy et al. .............. 385/17 |
| 2002/0061160 | A1 | * | 5/2002 | Solgaard et al. .............. 385/18 |
| 2002/0067887 | A1 | * | 6/2002 | Tomlinson et al. .............. 385/37 |
| 2002/0071627 | A1 | * | 6/2002 | Smith et al. .............. 385/15 |
| 2002/0131688 | A1 | * | 9/2002 | Chen et al. .............. 385/24 |
| 2002/0154855 | A1 | * | 10/2002 | Rose et al. .............. 385/24 |
| 2003/0002791 | A1 | * | 1/2003 | Cao .............. 385/37 |

FOREIGN PATENT DOCUMENTS

| EP | 0 859 249 A1 | 8/1998 |
| EP | 0 884 629 A2 | 12/1998 |
| WO | WO 01/45430 A2 | 6/2001 |

* cited by examiner

*Primary Examiner*—John D. Lee
*Assistant Examiner*—Daniel Valencia
(74) *Attorney, Agent, or Firm*—Teitelbaum & MacLean; Neil Teitelbaum; Doug MacLean (57) ABSTRACT

A fiber optic wavelength switch that includes a front-end unit having optical ports for receiving and transmitting optical signals; a wavelength dispersion element (e.g., diffraction grating, prism, etc.) for defining a dispersion plane; a light redirecting element (e.g., spherical reflector) associated with the wavelength dispersion element; and an actuation array (e.g., MEMS) operative with the light redirecting element for tilting an optical signal substantially perpendicular to the dispersion plane defined by the wavelength dispersion element. The wavelength switch can be implemented as a one input/output port and several add/drop ports type device, which can add/drop wavelengths from/to the in/out port. The front-end unit having a fiber array coupled to a micro-lens array with optical signals from the micro-lens being directed by a further lens.

13 Claims, 12 Drawing Sheets

WAVELENGTH SWITCH

CROSS REFERENCE TO RELATED APPLICATIONS

This application claims the benefit of U.S. Provisional Application No. 60/304,407, filed Jul. 12, 2001 entitled "Wavelength switch with multiple tunable optical ports".

FIELD OF THE INVENTION

The present invention relates generally to optical switches, and in particular fiber optic wavelength switching with multiple tunable optical ports.

BACKGROUND OF THE INVENTION

The growth of the Internet and other broadband services demands increased capacity of long haul and metropolitan communication infrastructures. The increased bandwidth provided by fiber optic systems is often insufficient to support such demand, and fiber exhaustion is now a concern for many network operators. In the past, a practical alternative that satisfied demand for more bandwidth at established bit rates is dense wavelength division multiplexing (DWDM), which combines many wavelengths of light at a variety of bit rates onto a signal optical fiber. However, as more transmission bandwidth becomes equivalent to more optical wavelengths, the saturated capacity and economic viability of electronic digital cross-connects (DXCs), add/drop multiplexers (ADMs), and fault management architectures can become problematic. Motivation is increasing to manage bandwidth optically rather than electronically.

Current devices used to move in the optical management direction include optical add/drop multiplexers (OADMs) and configurable OADMs (COADMs). OADMs provide fixed access to a subset of wavelengths in a DWDM system and provide static bandwidth management. OADMs have no routing flexibility and generally have no provision for monitoring signal power. COADMs expand OADMs because of dynamic configurability.

For example, an input fiber may have 40 wavelengths with 100 GHz ITU grid spacing. A demultiplexer (DEMUX) separates a subset of the wavelengths and sends each subset to 2×2 optical switches (for example) that either pass through or drop signals and allow the addition of a particular wavelength. All wavelengths are then combined by a multiplexer (MUX) onto the output fiber. The systems may include attenuators on the drop or through channels to equalize optical power, and there can be optical power tabs and photodiodes to monitor signal power or status of each wavelength.

Another traditional solution involves full wavelength cross-connect capable switching any wavelength from any incoming port to any outgoing port. However, full cross-connect switches are typically complex due to large beam steering requirements.

Consequently, there is a need for an optical switch that enhances the functionality and effectiveness of a COADM based system without the complexities associated with full cross-connect switches.

SUMMARY OF THE INVENTION

In accordance with one aspect of the present invention there is provided a fiber optic wavelength switch comprising: (a) a front-end unit having a plurality of optical ports, said front-end unit comprising: (i) a fiber array comprising a plurality of fibers coupled to the plurality of optical ports for transmitting and receiving optical signals; (ii) a micro-lens array having a plurality of micro-lenses, each micro-lens being coupled to a respective fiber; and (iii) a lens for receiving and re-directing the optical signals from the micro-lens array; (b) a wavelength dispersion element defining a dispersion plane; (c) a light redirecting element associated with the wavelength dispersion element; and (d) an actuation array operative with the light redirecting element for tilting the optical signals substantially perpendicular to the dispersion plane defined by the wavelength dispersion element.

In accordance with another aspect of the present invention there is provided an optical device for rerouting and modifying an optical signal comprising: (a) a front-end unit having a first port for launching a beam of light and a second port for receiving a beam of light, said front-end unit comprising: (i) a fiber array comprising a plurality of fibers coupled to the first port for transmitting beams of light and to the second port for receiving beams of light; (ii) a micro-lens array having a plurality of micro-lenses, each micro-lens being coupled to a respective fiber; and (iii) a lens for receiving and re-directing the beams of light from the micro-lens array; (b) a light redirecting element having a focal plane for receiving the beam of light launched from the first port; (c) a wavelength dispersion element defining a dispersion plane and disposed substantially at the focal plane of the light redirecting element for spatially dispersing a reflected beam of light from the light redirecting element and for redirecting the spatially dispersed beam of light back to the light redirecting element; and (d) an actuation array disposed at the focal plane of the light redirecting element for modifying the spatially dispersed beam of light reflected from the light redirecting element in a direction substantially perpendicular to the dispersion plane defined by the wavelength dispersion element and for reflecting the modified spatially dispersed beam back to the second port of the front-end unit through the light redirecting element and the wavelength dispersion element.

In accordance with another aspect of the present invention there is provided a method of rerouting and modifying an optical signal comprising: (a) launching a beam of light towards a reflecting element having a focal plane; (b) redirecting the beam of light incident on the reflecting element to a dispersion element defining a dispersion direction, said dispersion element disposed substantially at the focal plane; (c) spatially dispersing the redirected beam of light into a plurality of different sub-beams of light corresponding to a plurality of different spectral channels; (d) redirecting the plurality of different sub-beams of light to an actuation array optically disposed substantially at the focal plane; (e) selectively modifying the plurality of different sub-beams of light in a direction substantially perpendicular to the dispersion direction and reflecting them in a substantially backwards direction; and (f) redirecting the selectively modified plurality of different sub-beams to the dispersion element and combining them to form output beams of light.

In accordance with another aspect of the present invention there is provided an optical device for rerouting and modifying an optical signal comprising: (a) a first port for launching a beam of light, said first port comprising: (i) a fiber coupled to the first port for transmitting and receiving optical signals; (ii) a micro-lens coupled to the fiber; and (iii) a lens for receiving and re-directing the optical signals from the micro-lens; (b) a first light re-directing element having a focal plane for receiving the beam of light launched from the first port; (c) a first wavelength dispersion element defining a dispersion direction and disposed substantially at the focal plane of the light redirecting element for spatially dispersing a reflected beam of light from the light redirecting element and for redirecting the spatially dispersed beam of light back to the light redirecting element; (d) a transmissive deflector disposed substantially at the focal plane for receiving the spatially dispersed beam of light reflected from the first light redirecting element and redirecting the spatially dispersed beam of light in a direction substantially perpendicular to the dispersion direction defined by the first wavelength dispersion element; (e) a second light redirecting element for receiving the spatially dispersed beam of light from the transmissive deflector; and (f) a second wavelength dispersion element for recombining the spatially dispersed beam of light from the second light redirecting element and for directing the recombined beam of light to the second light redirecting element.

In accordance with another aspect of the present invention there is provided a fiber optic wavelength switch comprising: (a) a front-end unit having a plurality of optical ports coupled to a plurality of lenses for transmitting and receiving beams of light; (b) a wavelength dispersion element defining a dispersion direction; (c) a light redirecting element associated with the wavelength dispersion element; and (d) an actuation array operative with the light redirecting element for tilting the beams of light substantially perpendicular to the dispersion direction defined by the wavelength dispersion element.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Further features and advantages of the present invention will be described in the detailed description, taken in combination with the appended drawings, in which.

DETAILED DESCRIPTION OF EMBODIMENTS OF THE PRESENT INVENTION

Figure 1:
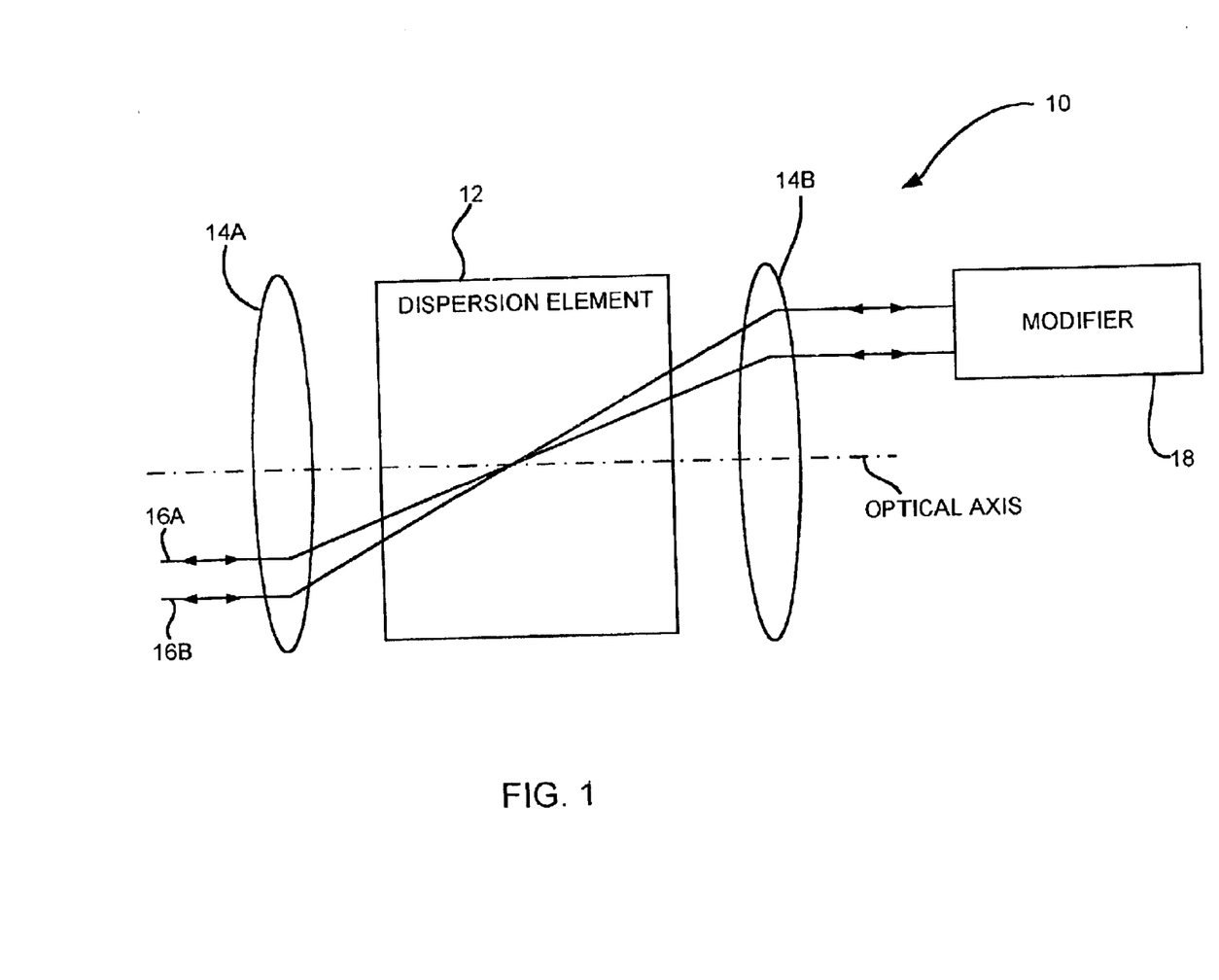
FIG. 1 is a block diagram representation of a generalized optical device.

A generalized optical device 10 for rerouting and modifying an optical signal is shown in FIG. 1. The optical device 10 includes a dispersion element 12 (e.g., prism, diffraction grating etc.) disposed between and at a focal plane of elements 14A and 14B having optical power. Two ports 16A and 16B are shown at an input/output end with bi-directional arrows indicating that light launched into port 16A can be transmitted through the optical device 10 and can be reflected backward to the input port from which it was launched 16A, or alternatively, can be switched to port 16B or vice versa in a controlled manner. Although only two input/output ports are shown to facilitate an understanding of the device 10, a plurality of such pairs of ports can be provided. The optical device 10 also includes a modifier 18 for modifying at least a portion of the light incident thereon.

Figure 2:
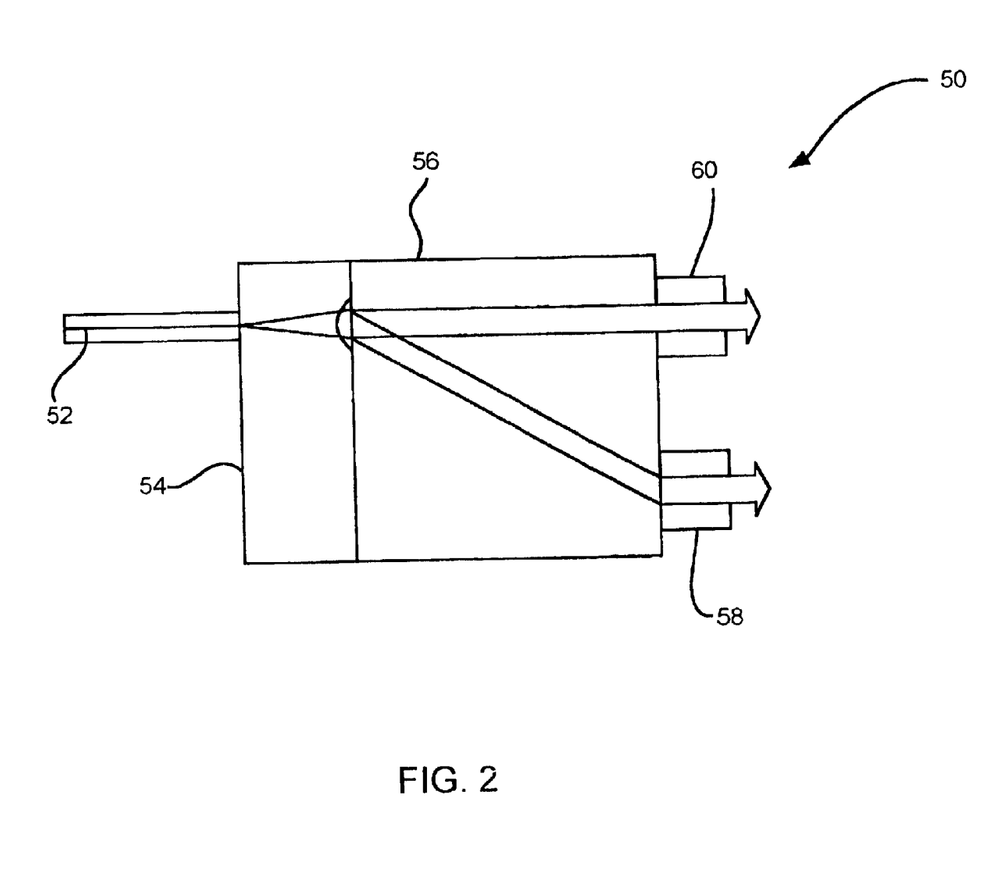
FIG. 2 is a block diagram representation of an example of a front-end micro-optical component.

The modifier 18 and/or the dispersion element 12 are generally dependent on polarization of the incident light beam. In particular, light having a known polarization state is provided to obtain selected switching and/or attenuation. Many different polarization diversity arrangements can be used. For example, FIG. 2 shows a front-end micro-optical component 50 for providing light having a known polarization. The component 50 includes a fiber tube 52, a micro lens 54 and a birefringent element 56 (e.g., a crystal) for separating an input beam into two orthogonal polarized sub-beams.

At an output end, a half wave plate 58 is provided to rotate the polarization of one of the beams by 90° to ensure both beams have the same polarization state. A second wave plate 60 is added to the birefringent element 56 to lessen the effects of Polarization Mode Dispersion (PMD) induced by the difference in optical path length along the two diverging paths of the birefringent element 56. For ease of understanding, only a single input beam of light is shown in FIG. 2. However, the front-end micro-optical component 50 is capable of carrying many more beams of light there through (various embodiments of which are illustrated in FIGS. 4C and 6B).

Figure 3:
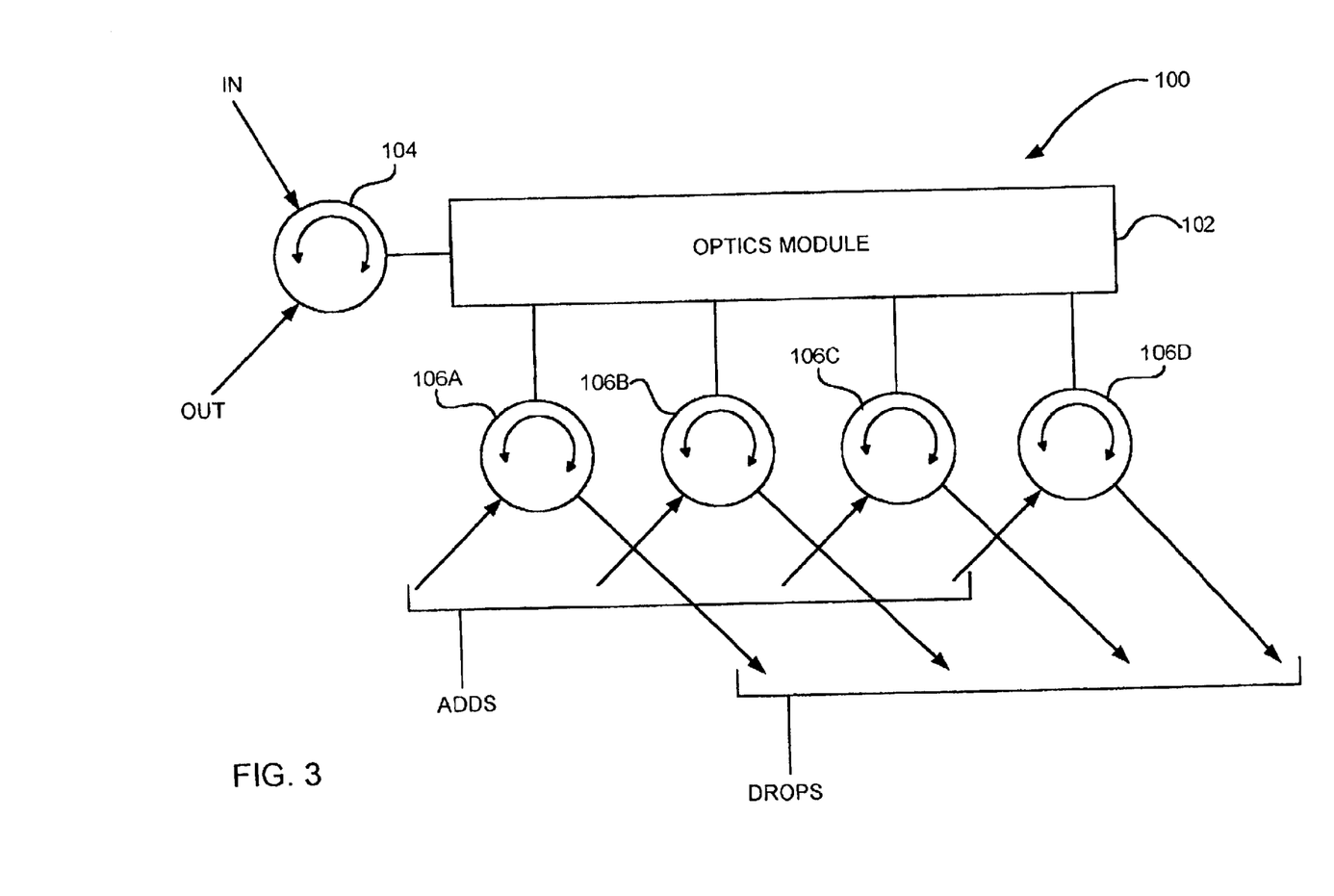
FIG. 3 is a block diagram representation of a multi-port optical device according to an embodiment of the present invention.

FIG. 3 provides an example of a generalized multi-port (10 ports) optical device 100. The device 100 includes an optics module 102 (specific configurations discussed herein below), an input/output circulator 104 and a plurality of add/drop circulators 106A–D. The device 100 can be used in dense wavelength division multiplexed (DWDM) communication systems to add and drop particular channels (i.e., wavelengths). For example, at predetermined nodes in a system, optical signals of selectable wavelengths are dropped from the optical wave guide and others are added.

Figure 4A:
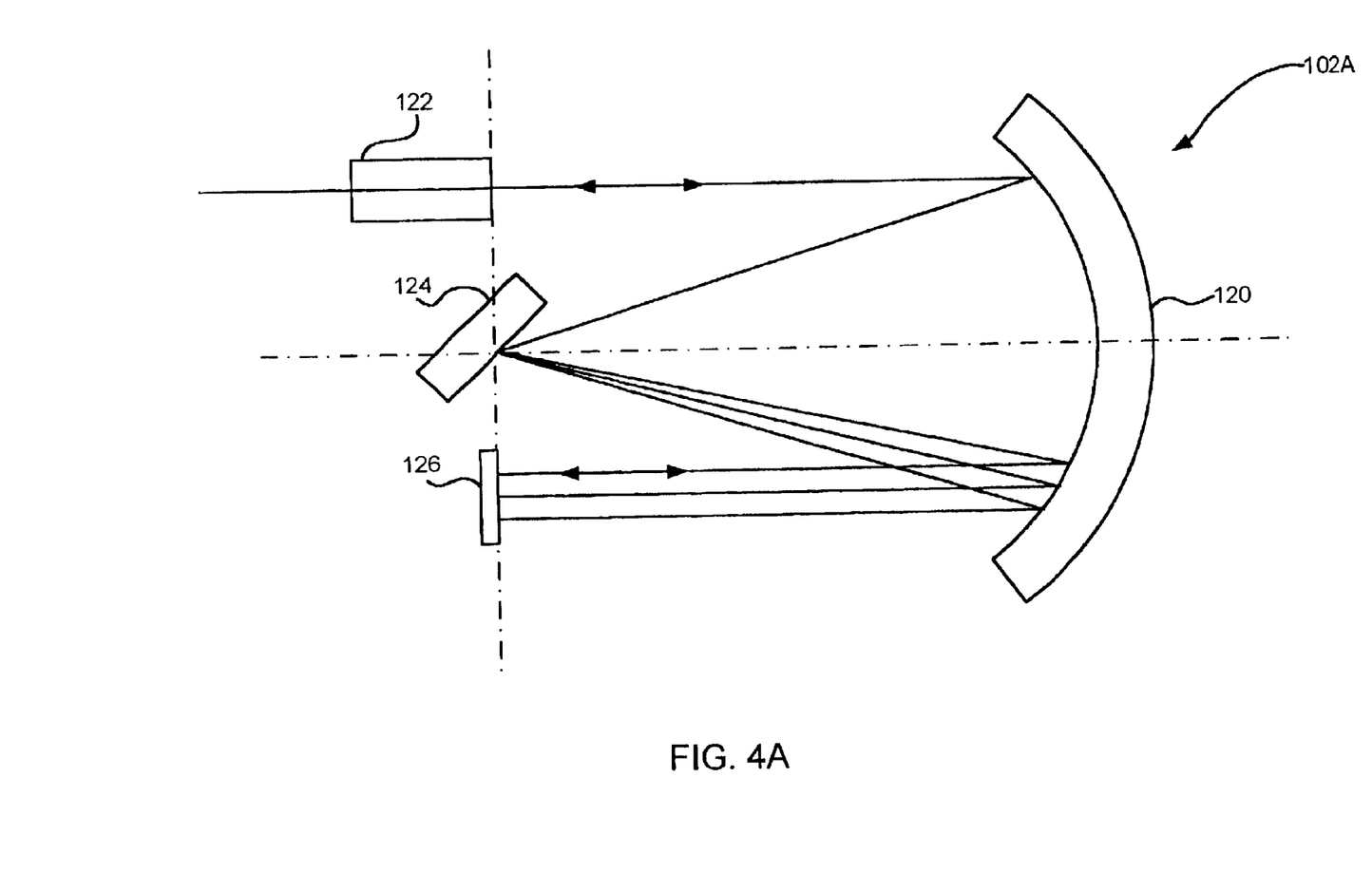
FIGS. 4A and 4B are top and side views, respectively, illustrating schematically the optics module shown in FIG. 3 according to an embodiment of the present invention.
Figure 4B:
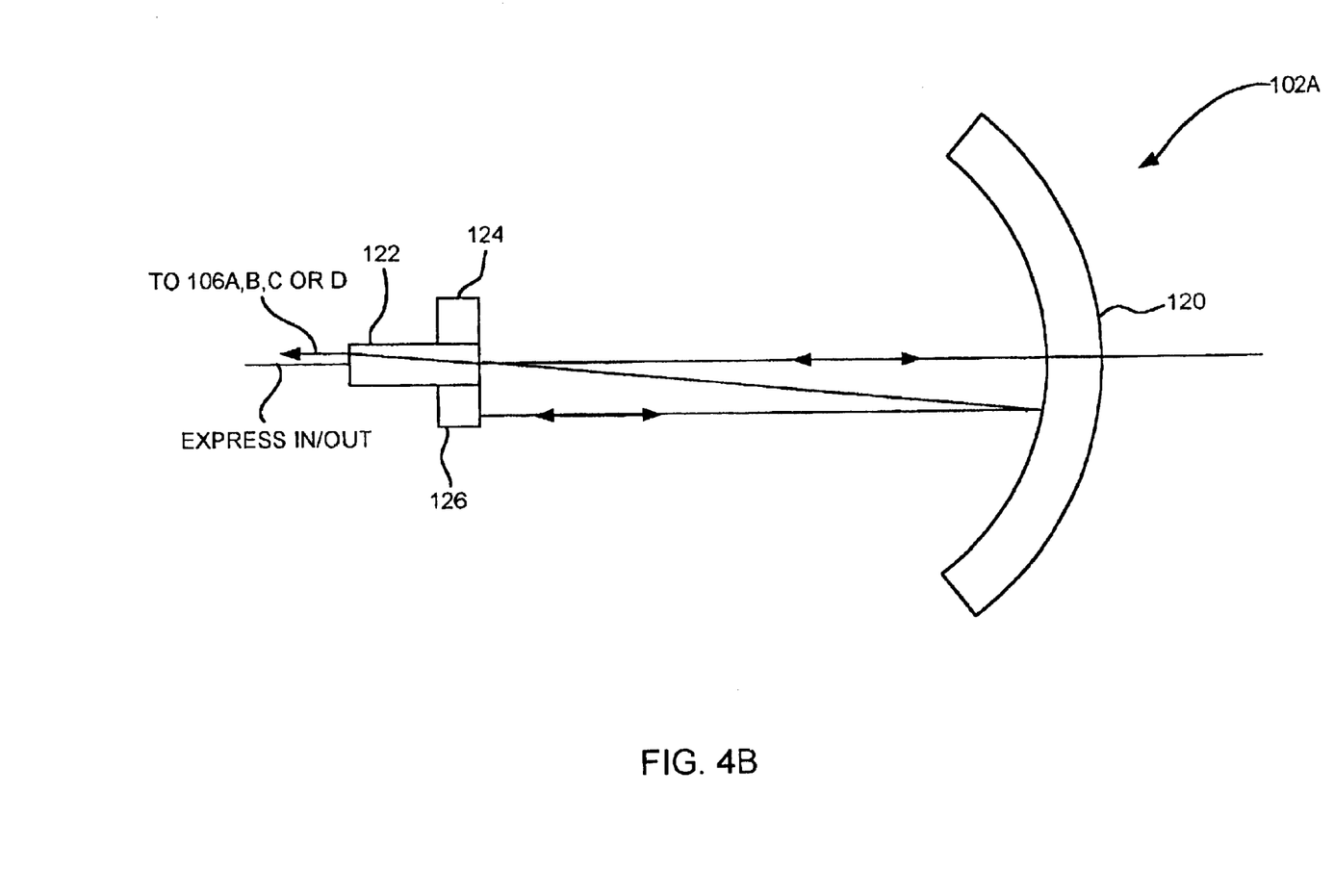
Figure 4C:
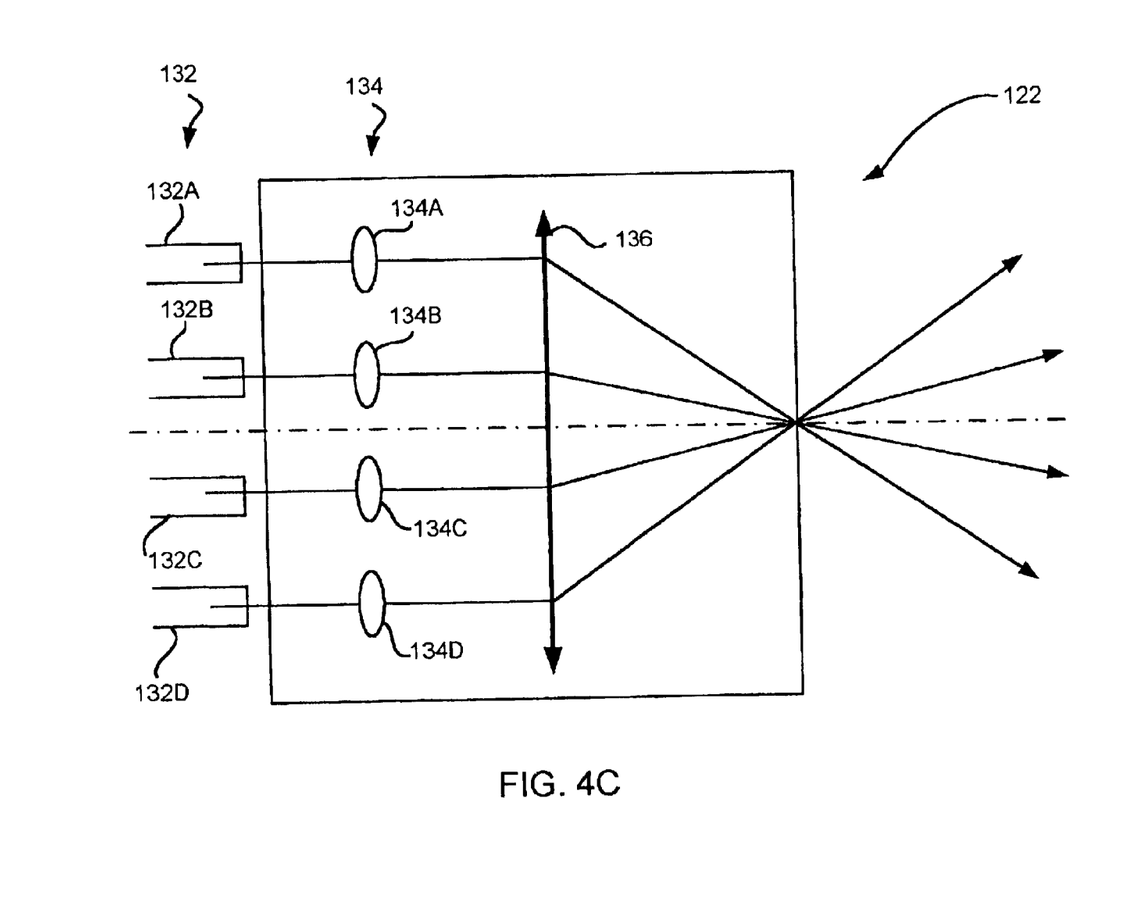
FIG. 4C is a block diagram representation of the front-end unit shown in FIGS. 4A–B according to an embodiment of the present invention.

FIGS. 4A and 4B provide an example module 102A of the optics module 102 according to an embodiment of the present invention. Specifically, FIG. 4A illustrates (top view) a light redirecting element having optical power in the form of a spherical reflector 120, which is used to receive a beam of light from a front-end unit 122 (detailed with a fiber array in FIG. 4C). The spherical reflector 120 also reflects beams of light to and from a diffraction grating 124 (i.e., an example of the dispersion element 12 shown in FIG. 1) and a micro-electro-mechanical systems (MEMS) array 126 (i.e., an example of the modifying means of FIG. 1). FIG. 4B illustrates a side view of the components shown in FIG. 4A to illustrate the relative positions of the elements (120, 122, 124, and 126) with respect to the focal plane of the reflector 120.

In operation, a multiplexed beam of light is launched into the front-end unit 122 to provide two sub-beams of light having the same polarization. The two beams of light are transmitted to the spherical reflector 120 and are reflected therefrom towards the diffraction grating 124. The diffraction grating 124 separates each of the two sub-beams into a plurality of sub-beams of light having different central wavelengths. The plurality of sub-beams of light are transmitted to the spherical reflector 120 where they are transmitted to the MEMS array 126 where they are incident thereon as spatially separated spots corresponding to individual spectral channels.

Each sub-beam of light corresponding to an individual spectral channel is modified and reflected backwards along substantially the same optical path in the top view of FIG. 4A and slightly offset in side view of FIG. 4B. The sub-beams of light are transmitted, from the MEMS array 126, back to the spherical reflector 120 and are redirected to the diffraction grating 124, where they are recombined and transmitted back to the spherical reflector 120 to be transmitted to a predetermined input/output port shown in FIG. 4B.

FIG. 4C is a block diagram representation of the front-end unit 122 according to an embodiment of the present invention. The front-end unit 122 includes a fiber array 132 comprising a plurality of fibers 132A–D (four shown in this example), each fiber 132A–D transmits light to a respective micro-lens 134A–D of a micro-lens array 134. After passing through the respective micro-lens 134A–D the light beam is deflected by a lens 136 and directed to the reflector 120 (shown in FIGS. 4A/B).

Figure 5A:
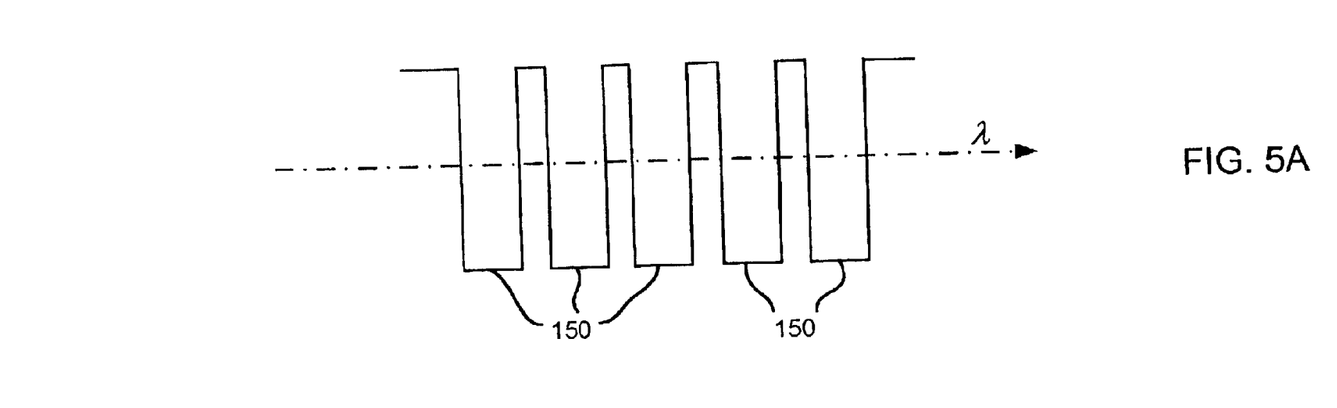
FIGS. 5A and 5B are block diagram representations of various MEMS array configurations according to embodiments of the present invention.
Figure 5B:
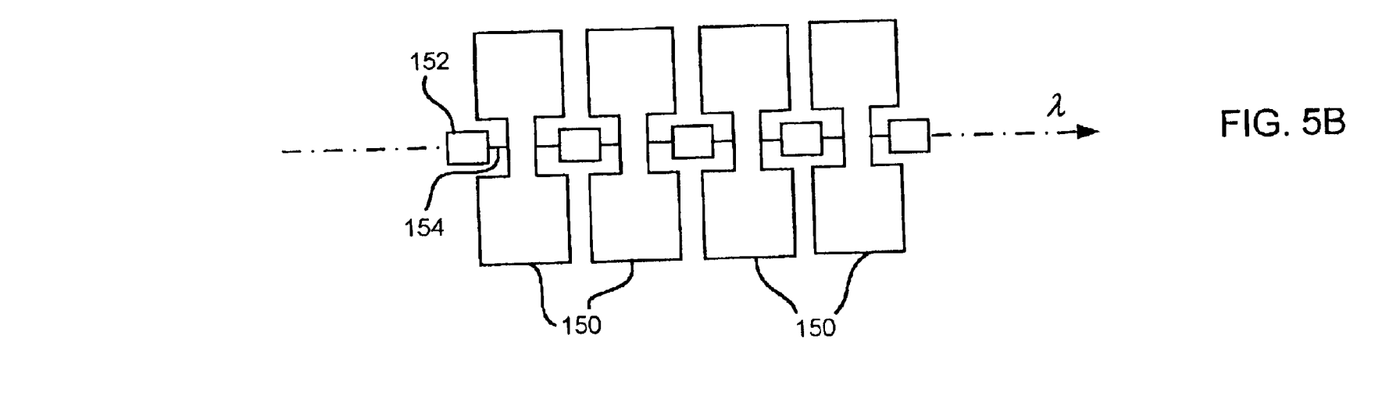

FIGS. 5A and 5B schematically illustrate two embodiments of the MEMS array 126 according to the present invention. The MEMS array 126 includes a plurality of MEMS elements 150 (e.g., mirrors, reflectors, etc.) that switch light beams in a direction perpendicular to a dispersion plane/direction (dotted line λ) defined by the dispersion element 12 (or more specifically the diffraction grating 124 of FIG. 4A). In the embodiment of FIG. 5B, the elements 150 are separated with pairs of elements 150 being interconnected to an anchor 152 by a pair of hinges 154.

Figure 6A:
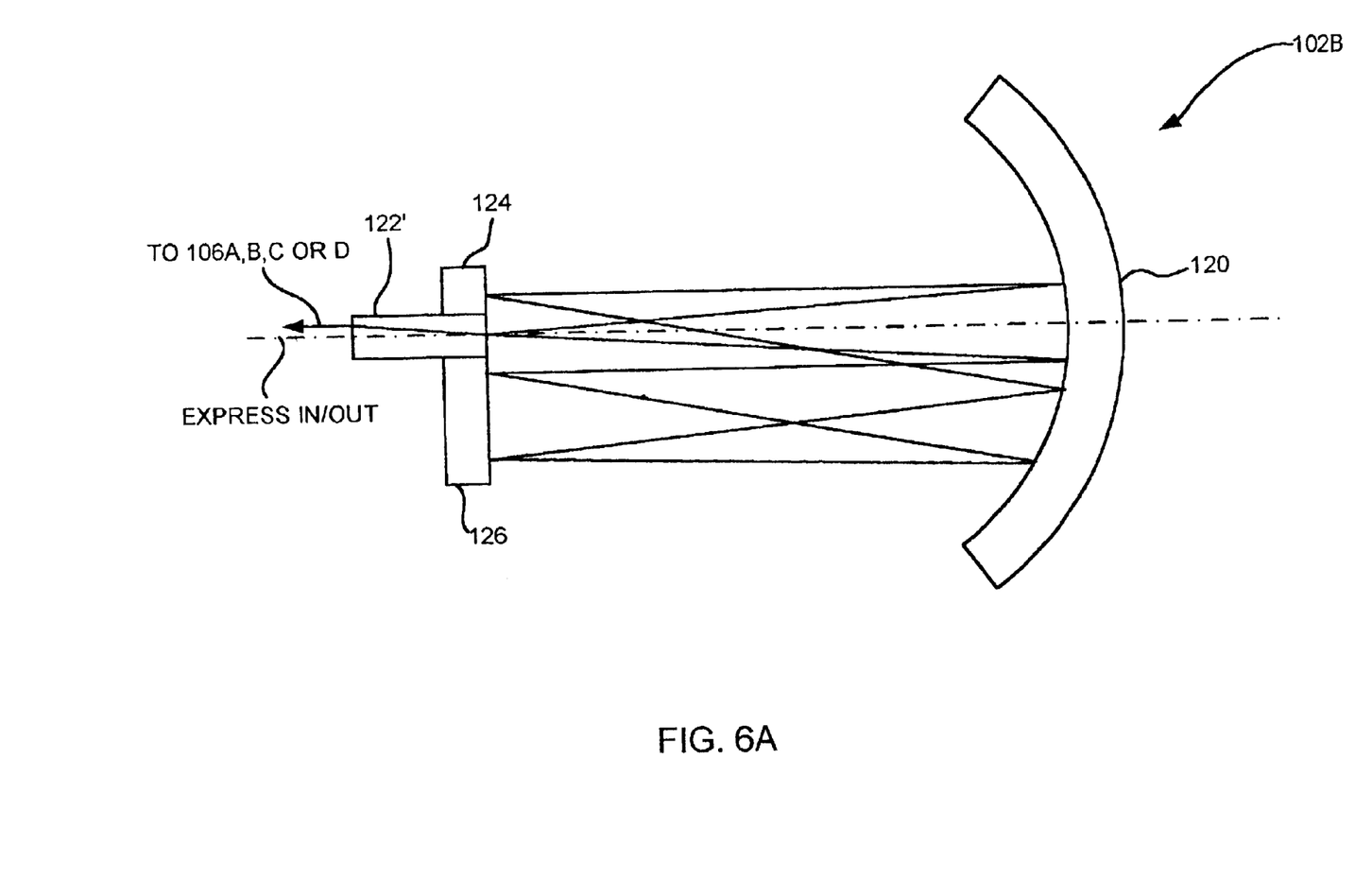
FIG. 6A is a side view illustrating schematically the optics module of FIG. 4A operating in a polarization diversity mode according to another embodiment of the present invention.
Figure 6B:
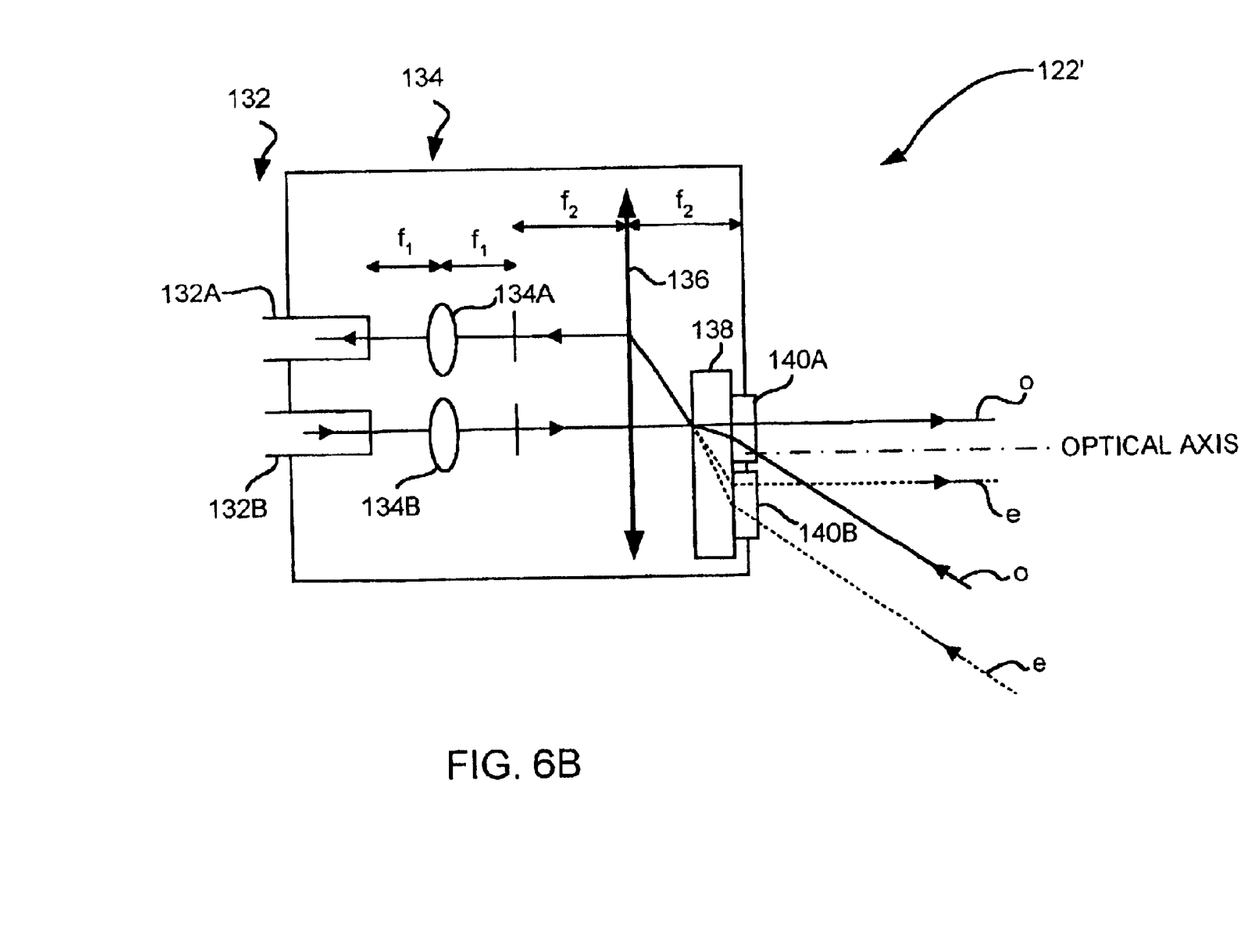
FIG. 6B is a block diagram representation of the front-end unit shown in FIG. 6A according to an embodiment of the present invention.

FIG. 6A provides an example module 102B of the optics module 102 according to another embodiment of the present invention, which supports polarization diversity. The example module 102B includes the same elements as discussed with example module 102A in FIGS. 4A and 4B, but illustrates a varied front end unit 122' as shown in FIG. 6B.

The varied front end unit 122' illustrates only two fibers 132A–B for simplicity and includes a polarization diversity module 138 (e.g., a crystal) having a pair of wave plates/glass blocks 140A and 140B. The wave plates 140A and 140B split a beam of light into two sub-beams as shown. In operation, fiber 132B transmits a light beam through the micro-lens 134B to the lens 136, which directs the light beam to the polarization diversity module 138 and out through the wave plate 140A (identified as light beam "o"). Light beam "o" returns (after processing through the optics module 102B) through wave plate 140A to the lens 136 and back out the fiber 132A passing through micro-lens 134A. Similarly, the trace of another light beam "e" is illustrated to show the result of a transformation of angle to position. The labels $f_1$ and $f_2$ are focal lengths.

Figure 7A:
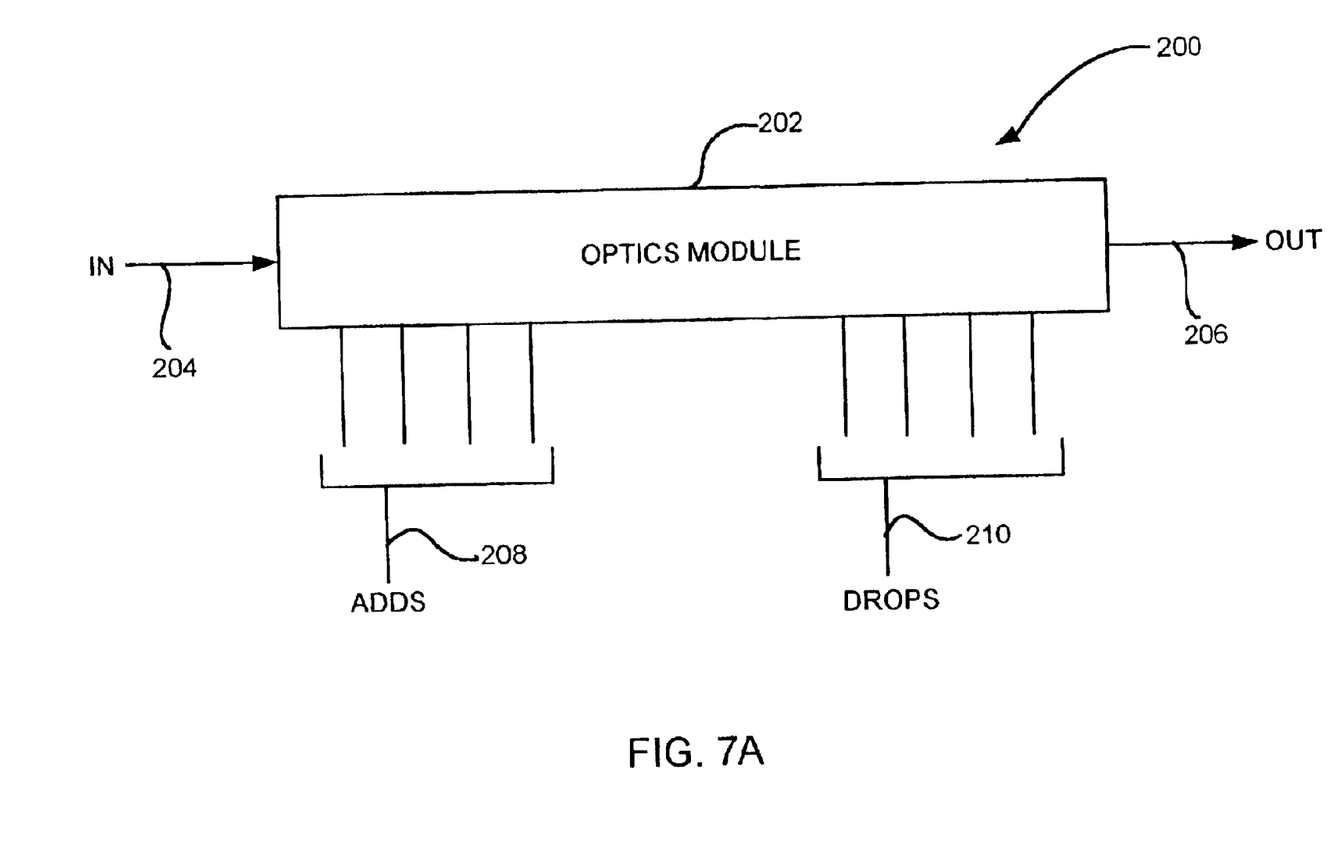
FIG. 7A is a block diagram representation of a multi-port optical device according to another embodiment of the present invention.

FIG. 7A provides an example of a generalized multi-port (10 port) optical device 200 according to another embodiment of the present invention. The device 200 includes an optics module 202 (specific configuration shown in FIG. 7B), an input port 204, an output port 206, a plurality of add ports 208 (four in this example), and a plurality of drop ports 210 (four in this example). The device 200 can be used in dense wavelength division multiplexed (DWDM) communication systems to add and drop particular channels (i.e., wavelengths). For example, at predetermined nodes in a system, optical signals of selectable wavelengths are dropped from the optical waveguide and others are added.

Figure 7B:
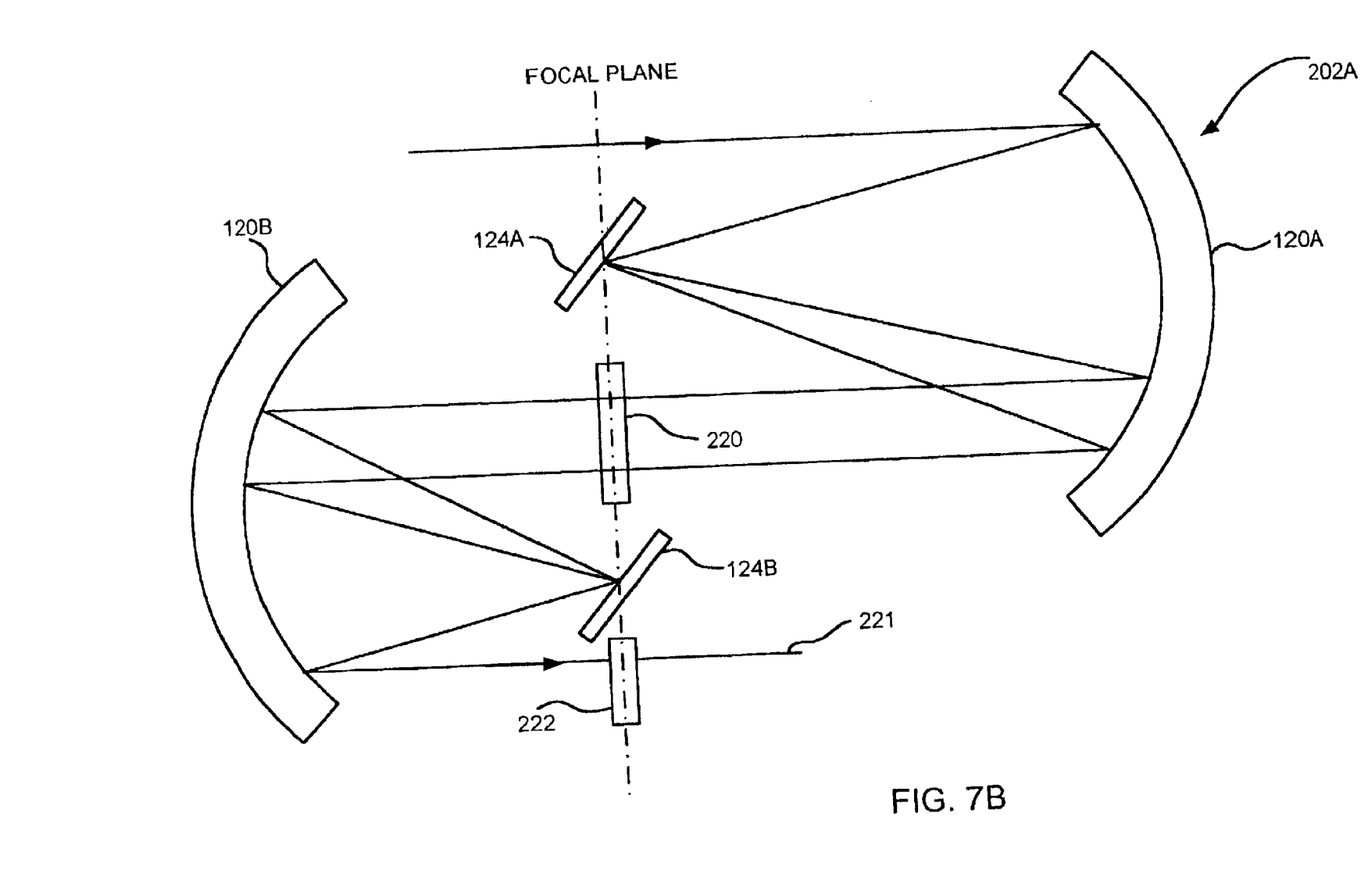
FIG. 7B is a top view illustrating schematically the optics module of FIG. 7A according to an embodiment of the present invention.

FIG. 7B provides an example module 202A of the optics module 202 of FIG. 7A according to an embodiment of the present invention. Specifically, FIG. 7A illustrates (top view) a pair of light redirecting elements having optical power in the form spherical reflectors 120A and 120B discussed previously. The reflector 120A is used to receive a beam of light that is reflected to a diffraction grating 124A back to the reflector 120A and to a transmissive deflector array 220 (e.g., a liquid crystal optical phase array—LC OPA and i.e., an example of the modifying means of FIG. 1). From the deflector 220, light is reflected from reflector 120B to and from a diffraction grating 124B and ultimately to an output port module 222.

In operation, a multiplexed beam of light is launched to provide two sub-beams of light having the same polarization. The two beams of light are transmitted to the spherical reflector 120A and are reflected therefrom towards the diffraction grating 124A. The diffraction grating 124A separates each of the two sub-beams into a plurality of sub-beams of light having different central wavelengths. The plurality of sub-beams of light are transmitted to the spherical reflector 120A where they are transmitted through the transmissive deflector 220 to the spherical reflector 120B where they are reflected towards the diffraction grating 124B. The diffraction grating 124B combines the sub-beams received from the reflector 120B and transmits the beam of light from the reflector 120B to one of a plurality of output ports 221 of the output port module 222.

Figure 7C:
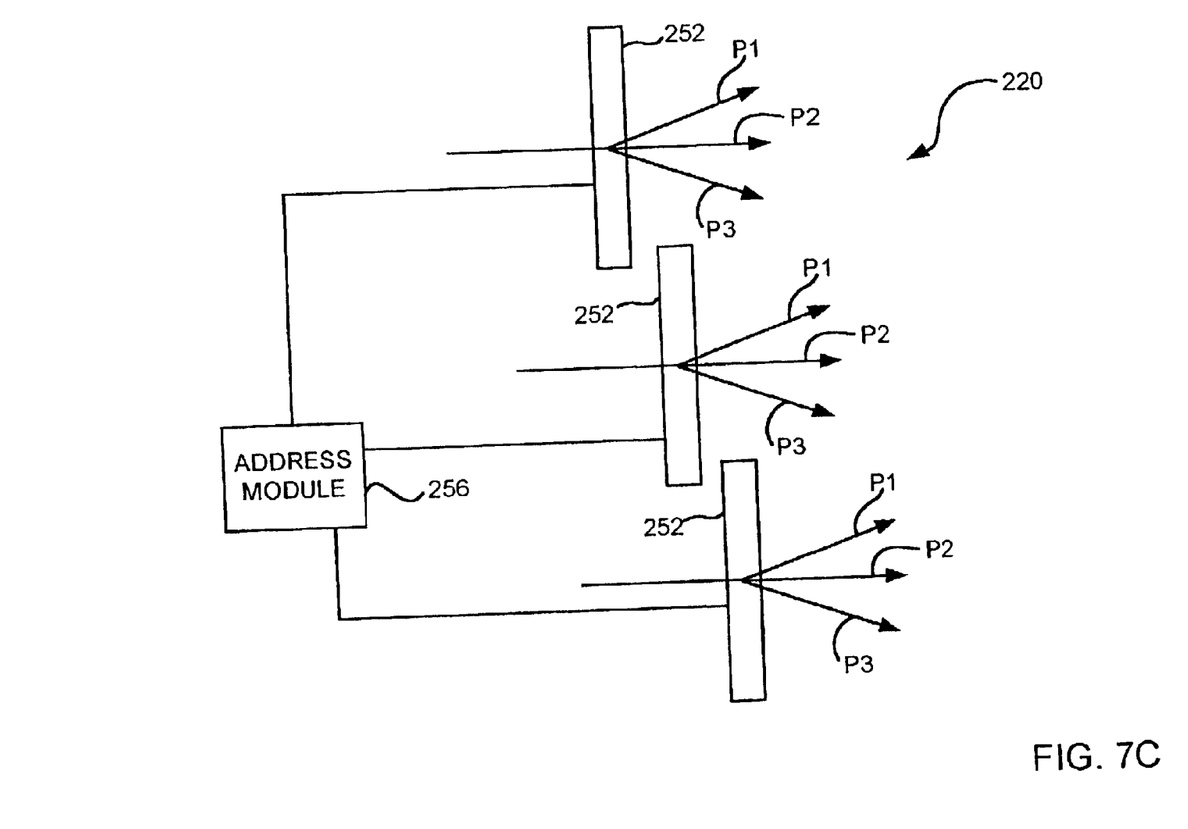
FIG. 7C is a block diagram representation of a liquid crystal deflection array according to an embodiment of the present invention.

FIG. 7C illustrates the liquid crystal (LC) deflection array 220 according to an embodiment of the present invention. The LC deflection array 220 includes at least one row of liquid crystal cells or pixels 252. Typically, each pixel 252 in the array 220 includes an optical phase array acting as an electro-writable diffraction grating. Output from each pixel 252 is coupled to a respective port P1, P2, and P3. An addressing module 256 selects an angle of deflection and thereby the specific port P1, P2 or P3 of the output port module 222 of FIG. 7B.

While the invention has been described and illustrated in connection with preferred embodiments it is to be understood that the subject matter herein is not to be limited to those specific embodiments. On the contrary, it is intended for the subject matter of the invention to include all alternatives, modifications and equivalents as can be included within the spirit and full scope of the following claims.

What is claimed is:

1. A fiber optic wavelength switch comprising:
   (a) a front-end unit having an input port and a plurality of output ports, said front-end unit comprising:
      (i) a fiber array comprising a plurality of fibers coupled to the input port and the plurality of output ports for transmitting and receiving optical signals, respectively;
      (ii) a micro-lens array having a plurality of micro-lenses, each micro-lens being coupled to a respective fiber; and (iii) a lens for receiving and re-directing the optical signals from the micro-lens array;

(b) a wavelength dispersion element defining a dispersion plane for dispersing an input optical signal from the input port into a plurality of sub-beams with different central wavelengths;

(c) a spherical reflector for redirecting the input optical signal launched from the input port to the wavelength dispersion element, and for redirecting the sub-beams from the wavelength dispersion element back along spatially separated parallel paths; and (d) an actuation array for redirecting a selected plurality of sub-beams back to the spherical reflector in a plane substantially perpendicular to the dispersion plane defined by the wavelength dispersion elements whereby the selected plurality of sub-beams are redirected by the spherical reflector back to the wavelength dispersion element for recombination into a recombined output beam, which is redirected via the spherical reflector to one of the output ports.

2. The fiber optic wavelength switch of claim 1, wherein the front-end unit further includes a polarization diversity module having at least one wave plate for splitting the optical signal into two sub-signals having substantially the same polarization state.

3. The fiber optic wavelength switch of claim 1, wherein the wavelength dispersion element includes one of a diffraction grating and a prism.

4. The fiber optic wavelength switch of claim 1, wherein the actuation array includes a micro-electro-mechanical systems (MEMS) device, the MEMS device having a plurality of reflectors movable about an axis defined by the dispersion plane.

5. The fiber optic wavelength switch of claim 4, wherein a position of each of the plurality of output ports is related to an angular displacement of input and output sub-beams of light to and from the MEMs device, respectively.

6. The fiber optic wavelength switch of claim 1, wherein the actuation array includes a liquid crystal deflection array having a plurality of pixels, each of the pixels having an optical phase array acting as an electro writable diffraction grating.

7. The fiber optic wavelength switch of claim 6, further comprising an addressing module for selecting an angle of deflection to provide a signal to one of the plurality of output ports.

8. An optical device for rerouting and modifying an optical signal comprising:

(a) a front-end unit having a first port for launching an input abeam of light, a second port for receiving a first output beam of light, and a third port for receiving a second output beam of light, (b) a light redirecting element having a focal plane for receiving the beam of light launched from the first port;

(c) a wavelength dispersion element defining a dispersion plane and disposed substantially at the focal plane of the light redirecting element for spatially dispersing the input a beam of light into a plurality of sub-beams with different center wavelengths, and for redirecting the sub-beams back to the light redirecting element; and (d) an actuation array disposed at the focal plane of the light redirecting element for selectively redirecting at least one of the sub-beams back to the wavelength dispersion element via the light redirecting element in a direction substantially perpendicular to the dispersion plane for recombination into the first output beam and output the second port, and for selectively redirecting at least one of the sub-beams back to the wavelength dispersion element via the light redirecting element in a direction substantially perpendicular to the dispersion plane for recombination into the second output beam and output the third port.

9. The optic device of claim 8, wherein the front-end unit further includes a polarization diversity module having at least one wave plate for splitting the input beam of light launched from the first port into two sub-beams having substantially the same polarization state.

10. The optic device of claim 9, wherein the wavelength dispersion element includes one of a diffraction grating and a prism; and wherein the light redirecting element includes a spherical reflector.

11. The optic device of claim 9, wherein the actuation array includes a micro-electro-mechanical systems (MEMS) device, the MEMS device having a plurality of reflectors movable about an axis defined by the dispersion plane.

12. A method of rerouting and modifying an optical signal comprising:

(a) launching an input abeam of light towards a reflecting element having a focal plane;

(b) redirecting the input beam of light incident on the reflecting element to a dispersion element defining a dispersion direction, said dispersion element disposed substantially at the focal plane;

(c) spatially dispersing the input beam of light into a plurality of different sub-beams of light corresponding to a plurality of different spectral channels directed towards the reflecting element;

(d) redirecting the plurality of different sub-beams of light incident on the reflecting element to an actuation array optically disposed substantially at the focal plane;

(e) selectively redirecting at least one of the sub-beams of light in a direction substantially perpendicular to the dispersion direction and reflecting them in a substantially backwards direction; and (f) redirecting the selectively redirected sub-beams to the dispersion element and combining them to form an output beam of light.

13. The method of claim 12, wherein the step of launching includes receiving the input beam of light in a micro-lens, and redirecting the input beam of light from the micro-lens using a lens to direct the input beam of light to the reflecting element.

* * * * *

UNITED STATES PATENT AND TRADEMARK OFFICE
CERTIFICATE OF CORRECTION

PATENT NO.   : 6,707,959 B2
DATED        : March 16, 2004
INVENTOR(S)  : Ducellier et al.

It is certified that error appears in the above-identified patent and that said Letters Patent is hereby corrected as shown below:

Column 7,
Line 15, "dispersion elements" should read -- dispersion element --
Line 50, "input abeam of light" should read -- input beam of light --

Column 8,
Lines 1 and 31, "input a beam" should read -- input beam --

Signed and Sealed this

Eighteenth Day of January, 2005

JON W. DUDAS
*Director of the United States Patent and Trademark Office*